US009139465B2

(12) United States Patent
Jain

(10) Patent No.: US 9,139,465 B2
(45) Date of Patent: Sep. 22, 2015

(54) CONDUCTIVE DOPED METAL-GLASS COMPOSITIONS AND METHODS

(75) Inventor: Himanshu Jain, Bethlehem, PA (US)

(73) Assignee: LEHIGH UNIVERSITY, Bethlehem, PA (US)

( * ) Notice: Subject to any disclaimer, the term of this patent is extended or adjusted under 35 U.S.C. 154(b) by 858 days.

(21) Appl. No.: 12/850,364

(22) Filed: Aug. 4, 2010

(65) Prior Publication Data

US 2011/0057154 A1 Mar. 10, 2011

Related U.S. Application Data

(60) Provisional application No. 61/231,181, filed on Aug. 4, 2009.

(51) Int. Cl.

| | |
|---|---|
| ***H01C 7/04*** | (2006.01) |
| ***C03B 9/00*** | (2006.01) |
| ***C03B 32/00*** | (2006.01) |
| ***C03C 1/00*** | (2006.01) |
| ***C03C 3/14*** | (2006.01) |
| ***C03C 4/14*** | (2006.01) |
| ***C03C 14/00*** | (2006.01) |
| ***H01B 1/08*** | (2006.01) |

(52) U.S. Cl.

CPC . *C03B 32/00* (2013.01); *C03C 1/00* (2013.01); *C03C 3/14* (2013.01); *C03C 4/14* (2013.01); *C03C 14/006* (2013.01); *H01B 1/08* (2013.01); *C03C 2214/16* (2013.01)

USPC .......................................... 252/518.1; 65/66

(58) Field of Classification Search

USPC ............ 252/518.1; 427/108, 118, 469, 419.4; 65/66

See application file for complete search history.

(56) References Cited

U.S. PATENT DOCUMENTS

| | | | | |
|---|---|---|---|---|
| 3,170,805 | A | 2/1965 | McMillan et al. | |
| 3,231,456 | A | 1/1966 | McMillan et al. | |
| 3,464,806 | A | 9/1969 | Seki et al. | |
| 3,490,887 | A | 1/1970 | Herczog et al. | |
| 3,704,110 | A | 11/1972 | Finn et al. | |
| 3,790,360 | A | 2/1974 | Kato et al. | |
| 3,802,892 | A | 4/1974 | Plrooz | |
| 3,876,407 | A | 4/1975 | Hlrose et al. | |
| 3,892,904 | A | 7/1975 | Tanaka | |
| 3,914,517 | A | 10/1975 | Pirooz | |
| 4,030,903 | A | 6/1977 | Rittler | |
| 4,134,747 | A | 1/1979 | Pierson et al. | |
| 4,837,383 | A * | 6/1989 | Andrews | 427/108 |
| 6,797,662 | B1 | 9/2004 | Jaffrey | |
| 7,628,896 | B2 | 12/2009 | Krasnov et al. | |
| 7,648,656 | B2 | 1/2010 | Borrelli et al. | |
| 2006/0162770 | A1 | 7/2006 | Matsui et al. | |
| 2007/0207335 | A1 * | 9/2007 | Karandikar et al. | 428/560 |
| 2008/0299325 | A1 | 12/2008 | Davis et al. | |
| 2009/0311498 | A1 | 12/2009 | Kiyomura et al. | |

FOREIGN PATENT DOCUMENTS

| | | |
|---|---|---|
| EP | 1 489 628 A1 | 12/2004 |
| JP | 47014998 * | 5/1972 |

OTHER PUBLICATIONS

"Transparent Solar Windows Set to Energize Homes," Inhabitat website, retrieved from the Internet URL: http://www.inhabitat.com/2008/04/14/dyesol-solar-windows/ [retrieved on Apr. 21, 2014].

Paul, "Chemistry of Glasses," Chapman & Hall, London, p. 264 (1982).

Doremus, J. Chem. Phys. 40, 2389 (1964).

Lin et al., Optics Express 15, 6374 (2007).

Chryssikos et al., J. Non-Cryst. Solids 172-174, 378 (1994).

Varsamis et al., Phys. Rev. B. 65, 104203 (2002).

Elliott et al., J. Non-Cryst. Solids 168, 167 (1994).

Berkemeier et al., Appl. Phys. Lett. 90, 113110 (2007).

Murawski et al., Solid State Ionics 176, 2145 (2005).

Ito et al., Appl. Phys. Lett 75, 3793 (1999).

Jain et al., Am. Ceram. Soc. Bull. 88(2), 31 (2009).

Moawad et al., J. Phys. Chem. Solids 70, 224 (2009).

* cited by examiner

*Primary Examiner* — Monique Peets

(74) *Attorney, Agent, or Firm* — Saul Ewing LLP

(57) ABSTRACT

Provided herein are conductive glass-metal compositions, as well as methods of making and using such compositions. In one example, the compositions include gold (Au) doped lithium-borate glasses shown to exhibit a transition from ionic to electronic conduction within the same sample. This is achieved via appropriate heat treatment, and particularly by heat treatment after annealing, wherein the post-annealing heat treatment is performed at temperatures below the glass transition temperature ($T_g$). The methods described herein are believed to introducing polarons formed from the trapping of electrons at partially ionized gold atoms. This unique electrical response provides new functionality to this class of nanocomposites. Additionally, increased thermal conductivity can be provided to an otherwise low conductive glass composition using the inventive methods and other subject matter provided herein.

20 Claims, 2 Drawing Sheets

CONDUCTIVE DOPED METAL-GLASS COMPOSITIONS AND METHODS

CROSS REFERENCE TO RELATED APPLICATIONS

This application claims priority to U.S. provisional patent application Ser. No. 61/231,181 filed on Aug. 4, 2009, and incorporates that application herein by reference.

BACKGROUND

Gold doped ruby glasses are classic examples of glass-metal composites that have been investigated for their striking optical properties. Manipulation of such glass-metal composites has been performed to alter the optical properties, such as to polarize or otherwise filter light.

In another field, transparent conducting oxides (TCO) are known to be used as a coating layer in a variety of technologies. For example, Indium-Tin-Oxide (ITO), a subcategory of TCO, is becoming increasingly useful for a growing number of high tech applications, including liquid crystal display (LCD), phones, aircraft windshields, transparent antistatic panels, de-icing and heater applications, among others. However, Indium is in limited supply, as there is barely enough to meet U.S. needs, let alone global demands. Therefore, there exists a continuing and unmet need for conductive materials that provide the benefits of TCOs such as ITO, but that do not require rare metals such as Indium.

BRIEF DESCRIPTION

The inventor has discovered a method of producing novel, conductive glass-metal compositions and articles made therefrom. The technology described herein alters the conductivity of materials such as glass, that generally possess low electrical conductivity, as well as low thermal conductivity. The technology provides for novel glass-metal composites that are expected to be highly useful in replacing indium in many technological applications requiring multifunctional materials, such as tough, transparent, electrically and/or thermally conductive coatings and/or substrates.

SUMMARY

In one embodiment, methods are provided for producing an electrically conductive glass. For example, a method comprising the steps of: providing a base composition comprising a lithium carbonate powder, and a boric acid powder; adding to the base composition at least one metal salt; mixing the base composition and metal salt to form a doped base composition; melting the doped base composition to form a doped glass melt; casting the doped glass melt at approximately room temperature to yield a doped glass article; thermally conditioning the doped glass article at a temperature of approximately the glass transition temperature ($T_g$) to remove residual stress; and after the step of thermally conditioning the doped glass article, heat treating the doped glass article at a temperature below $T_g$ for a time sufficient to yield a doped glass product having an electrical conductivity of at least one order of magnitude greater than the electrical conductivity of a non-doped glass article made by the steps of melting, casting, thermally conditioning, and heat treating.

In another embodiment, a conductive glass-metal composite is made by the method of the present invention. For example, a glass-metal composite made by the steps of providing a base composition comprising a lithium carbonate powder, and a boric acid powder; adding to the base composition at least one metal salt; mixing the base composition and metal salt to form a doped base composition; melting the doped base composition to form a doped glass melt; casting the doped glass melt at approximately room temperature to yield a doped glass article; thermally conditioning the doped glass article at a temperature of approximately the glass transition temperature ($T_g$) to remove residual stress; and after the step of thermally conditioning the doped glass article, heat treating the doped glass article at a temperature below $T_g$ for a time sufficient to yield a doped glass product having an electrical conductivity of at least one order of magnitude greater than the electrical conductivity of a non-doped glass article made by the steps of melting, casting, thermally conditioning, and heat treating.

Other embodiments of the invention include uses of the conductive glass-metal composites provided herein. For example, glass-metal composites provided herein as a component of an optoelectronic system, and wherein the system comprises at least one of a liquid crystal display (LCD), a windshield, an antistatic panel, a solar panel, a de-icing surface, and a heating element, among other things. By way of further example, the compositions are suitable for replacing TCO compositions, such as ITOs, and replacing and/or supplementing known TCOs and other known conductive compositions.

DETAILED DESCRIPTION

Figure 1:
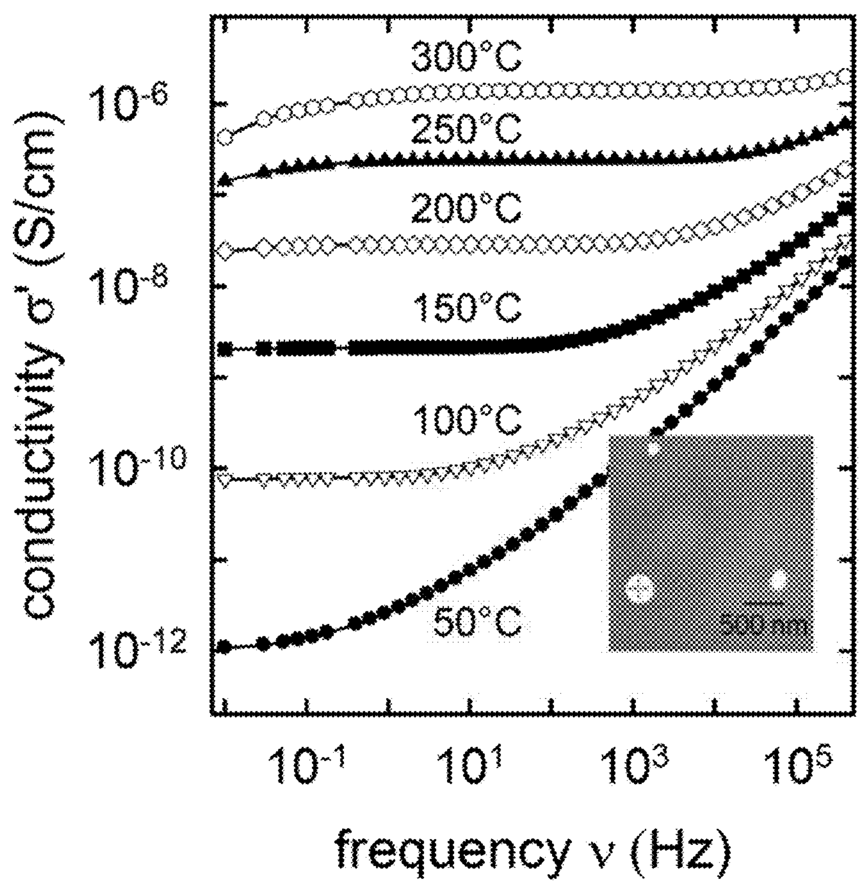
FIG. 1 is a graphical illustration of the frequency dependence of electrical conductivity of a glass-metal nanocomposite in accordance with the present invention.

There is emerging interest in multifunctional materials, which can serve more than one purpose. For example, the development of multifunctional glasses has been identified recently as one of the most motivating research objectives for the harvesting, storage, and efficient use of solar energy. (See, for example, H. Jain, C. Pantano, and J. Mazer, Am. Ceram. Soc. Bull. 88(2), 31 (2009)). In particular, glasses with appropriate combination of optical transmission and electrical conductivity are needed for enhancing the performance or introducing new functionality of optoelectronic and solid state ionic devices. The need for such multifunctional composites is largely unmet despite scientific efforts by many skilled in the art of composites.

Common oxide glasses, which contain alkali ions, are generally optically colorless and ionic conductors. The inventor has observed that the addition of transition metal oxides makes such glasses colored, and also provides for electronic conducting by polaron hopping, for example. In fact, by varying the ratio of alkali (or silver) oxide to transition metal oxide the nature of conduction can be varied gradually from predominantly ionic to electronic conductor. (See, for example, H. M. M. Moawad, H. Jain, and R. El-Mallawany, J. Phys. Chem. Solids 70, 224 (2009)) Obviously, a transition of this type requires change of composition, and therefore has but limited usefulness for introducing variable multifunctionality.

Otherwise colorless oxide glasses become colored by an entirely different mechanism, such as when a small amount of noble metal nanoparticles is introduced. A well known example is the bright ruby color that is produced by the addition of gold (for example, at about $\leq 10^{-3}$ mole % (mole percent)). (The colors are produced as a result of Mie scattering and/or surface plasmon resonance absorption by metal nanoparticles embedded in the oxide matrix. (See, for example, A. Paul, '*Chemistry of Glasses*', Chapman & Hall, London, 1982, p. 264; R. H. Doremus, J. Chem. Phys. 40, 2389 (1964); A. Lin, D. H. Son, I. H. Ahn, G. H. Song, and W.-T. Han, Optics Express 15, 6374 (2007)). Initially, the cast glass remains colorless, suggesting that gold is dissolved in the ionic state. A subsequent heat treatment, known as striking of gold, reduces $Au^+$ into neutral atoms with the help of reducing species, if present. The (zero valent $Au^0$) gold atoms then agglomerate to form nanocrystals of appropriate size, and thereby produce the desired color. Zero valent $Au^0$ is known to create color and other optical phenomena in gold doped glasses, as further described herein. In case of glasses without a reducing agent, the mechanism of reduction of $Au^+$ to $Au^0$ is more complicated. (See, for example, A. Paul reference, supra).

The inventor has discovered that optically enhanced nanocomposites, such as ruby colored gold (Au) doped glass made by previously known methods, can be improved upon by new and unprecedented methods herein to provide a novel and previously unknown electrical response, including a transition from ionic to electronic conduction in the same sample. The results described herein demonstrate such a transition by, for example, varying the heat treatments after the step of casting. The methods and compositions formed by the new methods described herein provide inventive optoelectronic-thermal functionality to glasses and glass-metal composites.

In one example, ionically conducting lithium borate glass, LBO ($20Li_2O.80B_2O_3$; glass transition temperature $T_g \approx 470°$ C.) (see, for example, G. D. Chryssikos, J. A. Duffy, J. M. Hutchinson, M. D. Ingram, E. I. Kamitsos, and A. J. Pappin, J. Non-Cryst. Solids 172-174, 378 (1994). C. E. Varsamis, A. Vegiri, and E. I. Kamitsos, Phys. Rev. B 65, 104203 (2002)) was prepared by melting lithium carbonate and boric acid powders in a Pt crucible at 1000° C. for 30 minutes. The melt was then cast in a stainless steel mold at room temperature. the cast glass was then annealed at the glass transition temperature Tg of 470 degrees C. for a time sufficient to relax the stresses in the glass. Thereafter, a batch of LBO was made by the same mixing, melting, casting, and annealing method, but including the addition of a doping agent in the powdered starting material mixture of lithium carbonate and boric acid. Specifically, glasses doped with 0.02 and 0.06 mole % gold (Au) were made by adding an appropriate amount of $HAuCl_4.3H_2O$ to the starting materials. Higher, or lower, concentrations of gold, as well as other conductive metals such as Fe, Ru, Os, Co, Rh, Ir, Ni, Pd, Pt, Cu, Ag, Zn, Cd, and Hg are suitable for use in producing suitable conductive glass-metal composites. In this example, after steps of mixing, melting, casting, annealing (at temperature in the vicinity of Tg), the annealed glass article, the article was subjected to post-annealing heat treatment at temperatures significantly below Tg. For example, the article was treated at 300 degrees C. (170 degrees below the $T_g$ of 470 degrees C.) for 3 hours to yield an electrically conductive gold doped glass article. The post-annealing heat treatment step can be conducted at any temperature significantly below the glass transition temperature, with the time length adjusted to produce the desired result. Preferably, the post annealing heat treatment temperature is more than about 30 degrees C. below, and more preferably at least about 100 degrees C. below $T_g$. The resulting glass article was tested as further described herein.

Shown in FIG. 1 is a graphic depiction of the frequency dependence of electrical conductivity of $20Li_2O.80B_2O_3$ glass doped with 0.06 mole % Au. The inset is a Scanning Electron Microscopy (SEM) micrograph of an as cast gold doped LBO sample containing 0.02 mole % Au.). Testing as illustrated in FIG. 1 revealed that the as-quenched LBO glass with 0.02 mole % Au doping included of spherical gold (Au) particles ranging in size from approximately 100 to 200 nm with an average of ~170 nm, although a few particles as large as 300 nm were also found. The gold particles appeared to be distributed uniformly throughout the sample, with inter-particle separation of >1 μm. These particles, which were present after annealing to relax stresses in the cast glass, as well as the color of the glass sample, did not appear to change upon post-annealing heat treatment conducted at temperatures significantly below the glass transition temperature $T_g$ (470 degrees C.). for example post-annealing heat treatment at about 300° C. for 3 h. Energy dispersive X-ray microanalysis of the doped glass sample at a particle indicated the presence of gold as well as oxygen and boron from the matrix. However, the concentration of gold in solid solution in regions away from nanoparticles was below the detection limit of the instrument. The optical absorption spectra of the gold doped samples in the visible region showed a broad absorption peak centered at 560-570 nm. Presence of striations precluded quantitative analysis, but there was no qualitative difference in the spectra obtained before and after the post-annealing heat treatment. The capacitance and conductance of the gold doped samples were measured on 1 mm thick disks (Ø8 mm) using Ti—Au electrodes, in the frequency range $10^{-3}$ Hz$\leq \nu \leq 10^6$ Hz using an α-analyzer from Novocontrol. The temperature during each frequency scan was stabilized to within ±0.1° C.

The alkali ion dynamics of non-doped LBO glasses was previously investigated for bulk samples as well as for thin films. (See, for example, R. J. Elliott, L. Perondi, and R. A. Barrio, J. Non-Cryst. Solids 168, 167 (1994); M. Eddrief, P. Dzwonkowski, C. Julien, and M. Balkanski, Solid State Ionics 45, 77 (1991); and F. Berkemeier, M. Shoar Abouzari, and G. Schmitz, Appl. Phys. Lett. 90, 113110 (2007)). As a typical example of the present gold doped samples, FIG. 1 shows the real part of the complex electrical conductivity, $\sigma^*(\nu)=\sigma'(\nu)+i\sigma''(\nu)$, of a sample with 0.06 mole % Au. At low temperatures, it reveals the typical transition from the dc plateau at low frequencies to a power law behavior, $\sigma' \propto \nu^s$ where $s \leq 1.0$, at high frequencies. The cross-over frequency as well as the dc conductivity increase strongly with temperature. At the highest temperatures and low frequencies, the conductivity falls below the dc plateau due to the use of blocking electrodes.

Figure 2:
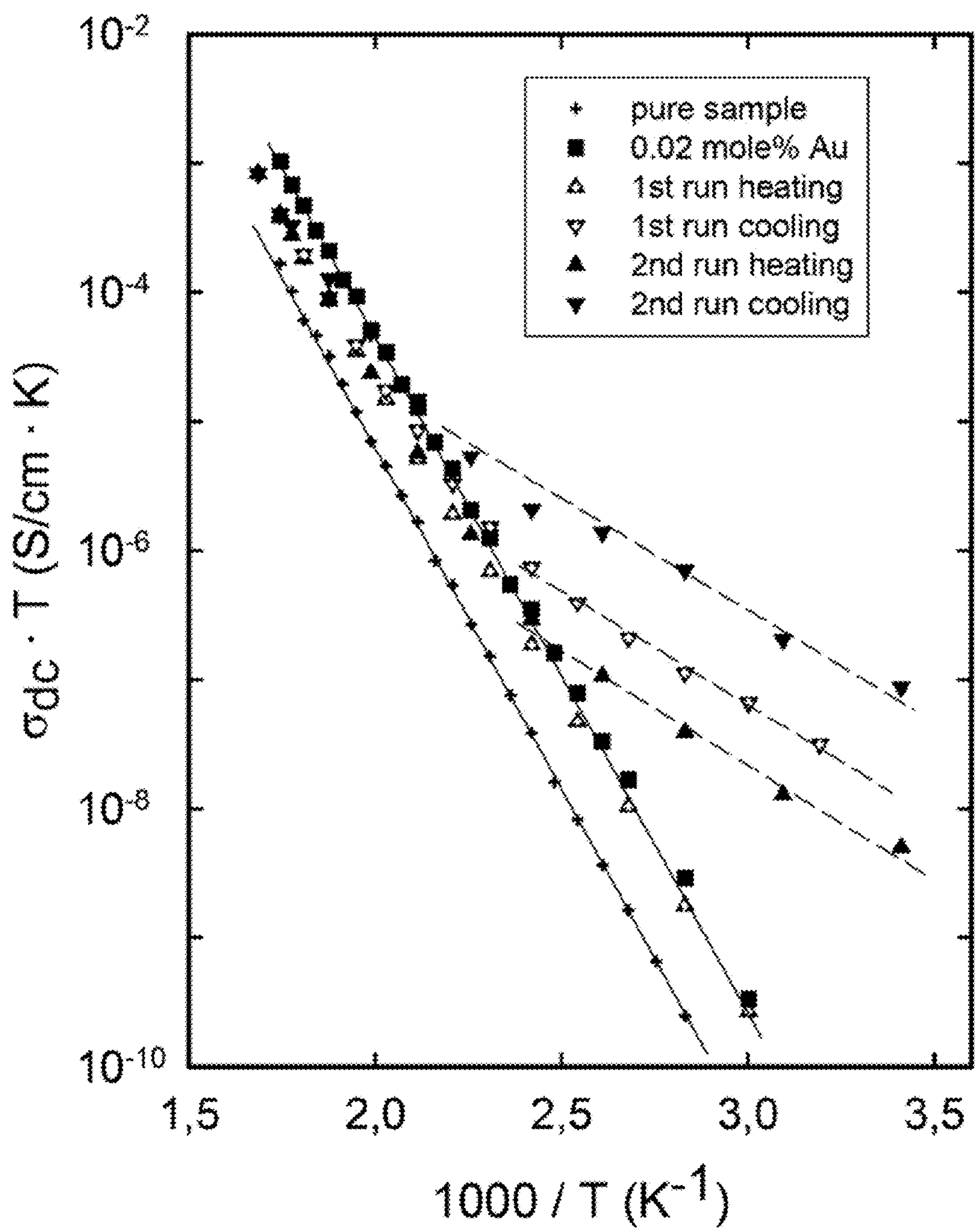
FIG. 2 is a graphical Arrhenius plot of the dc conductivity $\sigma_{dc}$ of non-doped (+) and 0.02 mole % Au doped (other symbols) glass-metal compositions in accordance with the present invention.

The temperature dependent dc conductivities for non-doped and 0.02% Au doped LBO samples are compiled in an Arrhenius representation, illustrated in FIG. 2. FIG. 2. is a graphical Arrhenius plot of the dc conductivity $\sigma_{dc}$ of non-doped (+) and 0.02 mole % Au doped (other symbols) $20Li_2O.80B_2O_3$ glass. The conductivity of the non-doped glass was reproducible. However, samples doped with 0.02 mole % Au showed marked differences in electrical conductivity between initial heating and subsequent cooling/heating. The solid and the dashed lines correspond to activation energies of 1.05 eV and 0.34 eV, respectively. However, in any event, the inventors noted that the conductivity of the glasses increases with the addition of Au. No significant difference in $^{11}B$ high-field MAS NMR spectra of these samples was observed. Nevertheless, it is conceivable that Au is present in ionic form, as well as in zero valent form, the ionic form causing minute changes in the structure too small to detect.

However, the change in conductivity was detectable among samples having increasing concentrations of gold as a result of doping of the starting materials.

For all heating runs the data could be described by an Arrhenius law, $\sigma_{dc}T \propto \exp(-E/k_BT)$, with an activation energy E of about 1.05 eV±0.1 eV. The non-doped LBO exhibits the lowest dc conductivity with E=(1.05±0.05) eV in accord with published data. (See, M. Eddrief, P. Dzwonkowski, C. Julien, and M. Balkanski, Solid State Ionics 45, 77 (1991); and F. Berkemeier, M. Shoar Abouzari, and G. Schmitz, Appl. Phys. Lett. 90, 113110 (2007)). The Au-doped sample, however, when heated and cooled has 4-5 times higher dc conductivity with about the same E. Hence, we conclude that the Li ion movement responsible for the observed conductivity is assisted by the Au particles. The atomistic nature, however, of the process remains an open question.

From FIG. 2 note that for non-doped glass, the heating and cooling values of the conductivity agree, as expected. However, for the Au doped specimens, in some cases the dc conductivities measured before and after heating (such as by a post-annealing heat treatment at temperatures below the glass transition temperature ($T_g$) of the glass as described herein) differ by 3 decades or more near room temperature. The dashed line in FIG. 2 represents E=0.34 eV as an estimate of the energy barrier characterizing some of the cooling runs. Apparently, annealing the doped sample in the vicinity of $T_g$ (annealing temperature 40° C. below $T_g$) introduced an additional conduction process represented by a distinctly lower E. The variation of the energy barrier observed during cooling (FIG. 2) appears to arise from the variation of the time and temperature of the annealing treatment.

Obviously, besides the usual Li ion transport a second conduction phenomenon occurs. The observed activation energy of 0.34 eV suggests that this is an electronic transport via small-polaron hopping. (See, for example, L. Murawski and R. J. Barczynski, Solid State Ionics 176, 2145 (2005)). Presumably, electrons are trapped at gold ions in a quasi neutral state. These atoms can be isolated atoms in solid solution or the ones at the surface of metal nanoparticles. Since the atoms on glass-metal interfaces must also bond to the remaining glass that is ionic-covalent, a partially ionic-metallic state is possible, which amounts to a trapped electron. There is indirect evidence for such a state from investigations of surface atoms in a copper-silica nanocomposite. (See, for example, Y. Ito, H. Jain and D. B. Williams, Appl. Phys. Lett. 75, 3793 (1999).

The distance between the gold nanoparticles is >1 μm, which appears too large for the hopping of a polaron, so that the hopping should be via gold atoms in solution. In the so-called "stable state" of glass, either the polarons are too few or too far apart to contribute to conduction. However, the annealing at high temperature creates polarons (such as by the excitation of valence electron on gold atoms) in a metastable state, which remain active when the sample is annealed near or below $T_g$ and cooled. Evidently, these polarons do not survive the high melting temperatures.

The above described transition from ionic to electronic conduction may be achieved by performing similar measurements on non-doped and Au-doped lanthanum borogermanate glass. In any case, the dc conductivity of non-doped glass is several orders of magnitude smaller than in LBO glass due to the lack of intentionally added mobile ions. However, a similar transition from ionic (E ~1.0 eV) to electronic (E ~0.36 eV) conduction is observed upon post-annealing heat treatment of the Au doped glass sample at temperatures below $T_g$, without changing the overall composition. In some examples, the post-annealing temperature is at least about 40 degrees Celcius below the glass transition temperature $T_g$. Additionally, the step of heat treating may last from one hour to ten hours, depending upon the desired result. It is especially surprising to the inventors and their colleagues that a post-annealing heat treatment below the glass transition temperature would alter any performance characteristic of the glass composition, especially an increase in electrical conductivity. Indeed, post-annealing heat treatments commonly exceed the glass transition temperature to facilitate a change in the composition characteristics, such as drawing heated glass-metal composites to facilitate drawing to alter optical properties, as described in U.S. Pat. No. 7,648,656 to Borrelli, et al. However, nothing in that reference teaches or motivates heat treatment below $T_g$ which could cause any significant increase in desirable properties such as increasing electrical conductivity by one or more orders of magnitude.

This invention includes the discovery of a transition from ionic to electronic conduction in the same sample of typical oxide glasses doped with gold, which occurs when it is properly heat treated. An additional electronic transport may be provided by hopping of small polarons formed by the electron trapped at partially ionized gold atoms uniformly distributed in the bulk or at the interface between nano metal particles and the matrix. This new phenomenon enables variable multi-functionality, and specifically an enhanced electrical conductivity by more than one order of magnitude, to glass-metal nanocomposites. In addition, the doped glass-metal compositions produced herein can exhibit increased thermal conductivity over non-doped compositions.

The invention claimed is:

1. A method for producing an electrically conductive glass, the method comprising the steps of:

providing a base composition comprising a lithium carbonate powder, and a boric acid powder;

adding to the base composition at least one metal salt;

mixing the base composition and metal salt to form a doped base composition;

melting the doped base composition to form a doped glass melt;

casting the doped glass melt at approximately room temperature to yield a doped glass article;

thereafter, thermally conditioning the doped glass article at a temperature of approximately the glass transition temperature (Tg) to remove residual stress;

after the step of thermally conditioning the doped glass article, heat treating the doped glass article at a temperature below Tg for a time sufficient to yield a doped glass product having electrically conductive metal particles that are substantially homogeneously dispersed throughout the doped glass product, the doped glass product having an electrical conductivity of at least one order of magnitude greater than the electrical conductivity of a non-doped glass article made by the steps of melting the base composition without adding a metal salt, casting, thermally conditioning, and heat treating.

2. The method according to claim 1, wherein the amount of metal salt provided is between about 0.02 and 0.20 mole percent.

3. The method according to claim 1, wherein the metal salt comprises at least one of a metal selected from the group consisting of Fe, Ru, Os, Co, Rh, Ir, Ni, Pd, Pt, Cu, Ag, Zn, Cd, and Hg.

4. The method according to claim 3, wherein the temperature below Tg is a temperature of at least 30 degrees Celsius below Tg, and wherein the time sufficient to yield the doped glass product is at least about two hours.

5. The method according to claim 3, wherein the doped glass product comprises metal particles having a mean diameter of between about $1\times10^1$ to $1\times10^2$ nanometers.

6. The method according to claim 3, wherein the metal salt is $HAuCl_4.3H_2O$.

7. The method according to claim 6, wherein the doped glass product comprises metal particles having a mean diameter of between about $1\times10^1$ to $1\times10^2$ nanometers.

8. The method according to claim 4, wherein the metal salt is $HAuCl_4.3H_2O$.

9. The method according to claim 8, wherein the metal particles in the doped glass product average between about 100 nm to about 300 nm in size.

10. The method, according to claim 1, wherein the doped glass product exhibits an observed activation energy of about 0.34 eV, which is characteristic of polaron conduction.

11. The method according to claim 1, wherein the distance between the metal particles in the doped glass product is greater than about 1 micrometer.

12. The method according to claim 3, wherein the doped glass product exhibits an observed activation energy of about 1.00 eV, which is characteristic of ionic conduction.

13. The method according to claim 10, wherein the doped glass product comprises electrically conductive metal particles spaced apart by an average distance greater than about 1 micrometer.

14. The method according to claim 13, wherein the distance between the electrically conductive metal particles are spaced apart by an average distance less than about 1 micrometer.

15. A method for producing an electrically conductive glass, the method comprising the steps of:

providing a base composition comprising a lithium carbonate powder, and a boric acid powder;

adding to the base composition at least one metal salt comprising at least one metal selected from the group consisting of Fe, Ru, Os, Co, Rh, Ir, Ni, Pd, Pt, Cu, Ag, Au, Zn, Cd, and Hg;

mixing the base composition and metal salt to form a doped base composition;

melting the doped base composition to form a doped glass melt;

casting the doped glass melt at approximately room temperature to yield a doped glass article;

thereafter, thermally conditioning the doped glass article at a temperature of approximately the glass transition temperature (Tg) to remove residual stress;

after the step of thermally conditioning the doped glass article, heat treating the doped glass article at a temperature below Tg for a time sufficient to yield a doped glass product having electrically conductive metal particles that are substantially homogeneously dispersed throughout the doped glass product, the doped glass product having an electrical conductivity that exhibits an activation energy of between about 0.34 eV and about 1.0 eV.

16. The method according to claim 2, wherein the amount of metal salt provided is between about 0.02 and 0.20 mole percent.

17. The method according to claim 15, wherein the temperature below Tg is a temperature of at least 30 degrees Celsius below Tg, and wherein the time sufficient to yield the doped glass product is at least about two hours.

18. The method according to claim 15, wherein the doped glass product comprises metal particles having a mean diameter of between about $1\times10^1$ to $1\times10^2$ nanometers.

19. The method according to claim 15, wherein the metal salt is $HAuCl_4.3H_2O$.

20. The method of claim 15, wherein the doped glass product is a doped glass substrate.

* * * * *